Aug. 28, 1945.  H. FRIEDMAN  2,383,477
PARALLEL ARRANGEMENT OF GEIGER-MULLER COUNTERS
Filed April 24, 1943  2 Sheets-Sheet 1
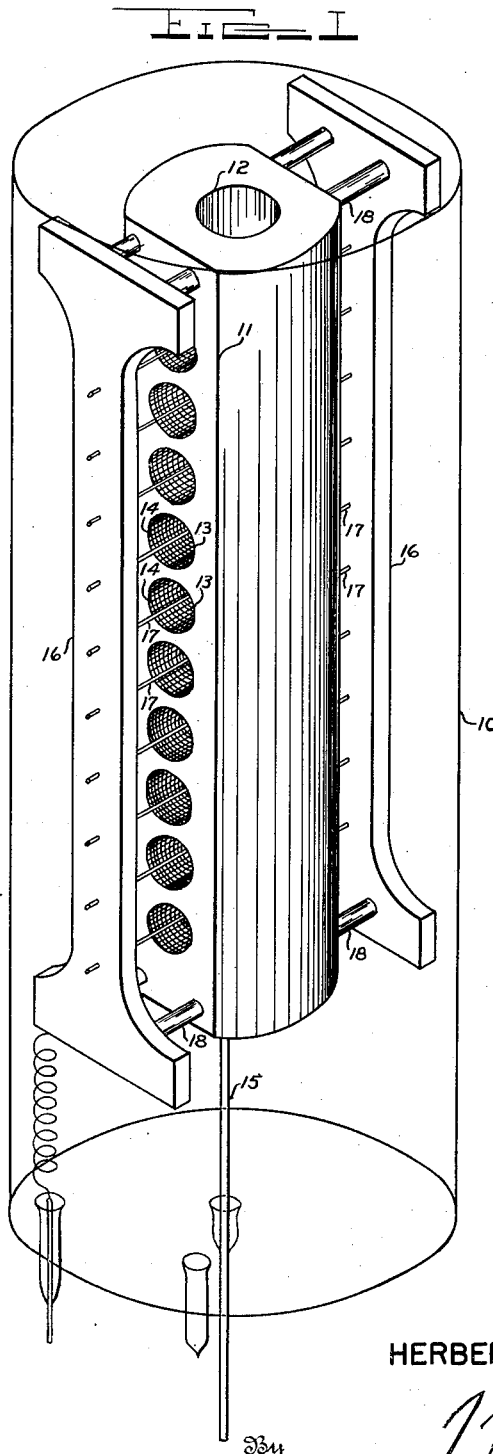
Inventor
HERBERT FRIEDMAN

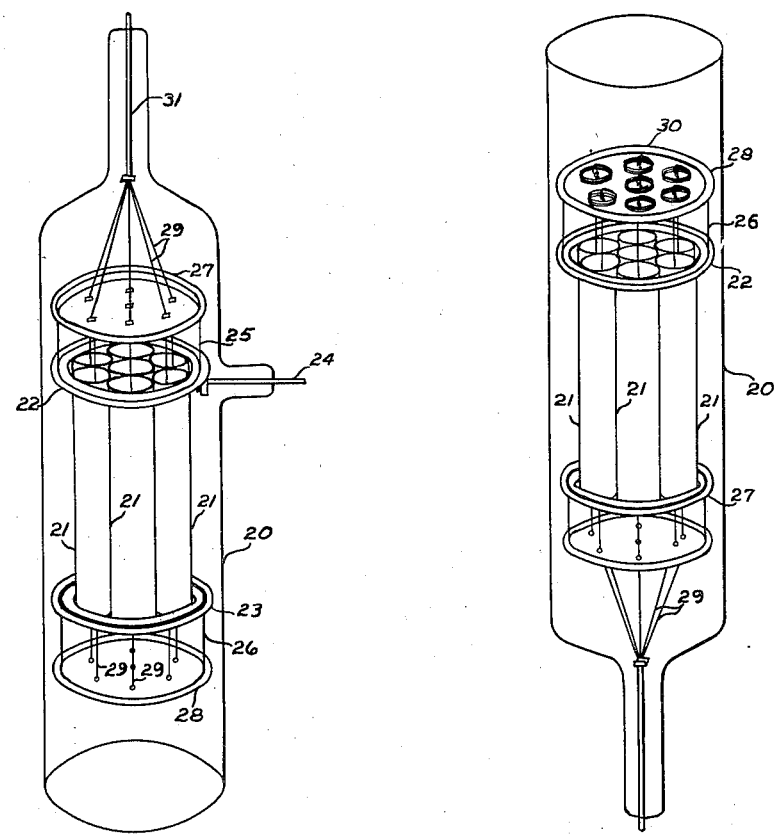

Patented Aug. 28, 1945

2,383,477

UNITED STATES PATENT OFFICE 2,383,477

PARALLEL ARRANGEMENT OF GEIGER-MULLER COUNTERS

Herbert Friedman, Arlington, Va.

Application April 24, 1943, Serial No. 484,349

4 Claims. (Cl. 250—83.6)

(Granted under the act of March 3, 1883, as amended April 30, 1928; 370 O. G. 757)

This invention relates to radiation measuring devices of the Geiger-Muller counter type and more specifically to devices of this type having unusually high resolution and efficiency.

Conventional Geiger-Muller counters of the type comprising a cylindrical cathode enclosing and insulated from a coaxially located anode wire, both elements being enclosed in a gas filled envelope containing a small percentage of hydrocarbon vapor, have been found adapted to a variety of uses involving the measurement of the intensity of gamma ray and X-radiation.

In operation, these devices have applied to their electrodes, voltages such that the absorption of a single quantum of radiation will trigger an electrical discharge between the wire and the cylinder.

In comprising intensities of penetrating radiations with a G-M counter, one observes the number of discharge pulses per unit time. The ratios of these counting rates are then taken as the ratios of the intensities. The accuracy of these measured ratios is determined entirely by the total number of pulses counted in each measurement, since the emission and absorption of X-ray or gamma ray quanta are random processes. According to the laws of probability, 4300 counts give the intensity with a probable error of 1 per cent but 430,000 are required for 0.1 per cent. Obviously, rapid measurement with high precision calls for the highest possible counting rates.

The time that elapses between the triggering of a discharge and the return of the counter to a condition where it can again register an ionization by a primary ray is called the "resolving time" of the counter. With well designed counters and associated circuits the major portion of the resolving time comprises the time necessary for the slow moving positive ions formed near the wire during the discharge, to travel far enough to permit the field strength in the neighborhood of the wire to recover to threshold field. This time has been found to be around $10^{-4}$ to $10^{-5}$ seconds for fast counters and represents an actual "dead time" during which the counter cannot respond to any incoming primary particles. The resolving time of the counter can never be less than the dead time.

Assuming a resolving time of $10^{-4}$ seconds, a maximum counting rate of 10,000 uniformly spaced pulses per second would be possible. However, if an intensity must be measured in one second with a mean error of 1 per cent, it does not suffice to be able to count 10,000 regular pulses per second. There are large fluctuations in the intervals between pulses of a random distribution such as is obtained from a radium source of gamma rays. Furthermore, the shortest time intervals are the most probable, so that even at counting rates far below the resolving power of the counter, many pulses come too close together to be resolved. For example, the counter we are considering would miss about ten per cent of the quanta absorbed, at a counting rate of 1000 per second.

In some applications the intensities do not exceed 1000 counts per second, and the simple tube counter suffices. In many instances, however, the intensities available are very high so that it becomes desirable to increase the resolution of the counter many orders of magnitude, to permit measurements at maximum speeds. For example, if a surface were to be scanned at a rate of $\frac{1}{10}$ second per point, then 450,000 counts per second would be necessary if a probable error of one per cent were required. Previously known counter devices are also of rather low quantum efficiency, that for gamma ray counters being about two per cent.

It is an object of this invention to provide a counter device of a Geiger-Muller type which will have a very high resolving power and high quantum efficiency.

Referring now to the drawings:

Fig. 1 is a perspective view of a counter device constituting one embodiment of the invention, and Figs. 2 and 3 are perspective views of a counter device constituting a second embodiment of the invention, Fig. 3 showing the device inverted with respect to the showing of Fig. 2.

The invention involves the grouping, in a single envelope, of a plurality of individual counters connected in parallel to a single voltage source and so arranged that all desired paths of incident radiation traverse more than one counter.

The device shown in Fig. 1 comprises a transparent envelope 10 in which is mounted in axial alignment a metal member 11 of modified cylindrical shape and having an axial bore 12. The member has formed therein a plurality of parallel bores 13 each extending completely through it, diametrically. Completely lining each of the bores is a fine meshed wire sheath 14 forming the cathode of a counter. This sheaths 14 are in conducting relation to the member 11 which effectively places them in parallel. A conductor 15 passing out through the end of the envelope connects the member to ground or a negative voltage source.

A pair of I-shaped metal bars 16 extend parallel to member 11 and serve to support the anode wires 17 for the respective counters. The bars 16 are supported by insulated rods 18 passing through holes formed in member 11. A conductor 19 extends out through the envelope to a source of high voltage.

The device of Fig. 1 is intended for use as a gamma ray counter where the rays are formed into a collinated beam. The device is placed so that the beam is directed along the bore 12. The use of the wire mesh as cathode material increases the effective surface area of each cathode such that the probability of triggering a discharge in one cylinder is doubled. This amounts to a doubling of its efficiency and provides a gain in addition to the increase in resouution provided by the multiplicity of counters.

The device shown in Figs. 2 and 3 is intended for the lateral reception of radiation and comprises an envelope 20 in which are positioned a plurality of individual counters parallel to and symmetrically arranged about the axis of the envelope. Seven individual counters are shown having their cylindrical sheet metal cathodes 21 conductively supported in metal end plates 22 and 23. A conductor 24 extends out through the envelope from plate 22. Spaced from plates 22 and 23 by insulating cylinders 25 and 26 are plates 27 and 28 respectively, each having holes formed therethrough at the points of intersection of the axes of the respective cathodes 21.

Through these holes extend the wires 29 forming the cathodes of the individual counters. Each wire terminates on the outside of plate 28 in a spiral spring 30, the opposite ends being drawn together outside of plate 27 and secured to a conductor 31 which emerges from the envelope.

With the counters connected in parallel the discharge in any individual counter produces only a small pulse on the wire system and so has very little effect on the operating conditions of the other counters. The dead time of each individual counter will remain unaffected. In spite of the parallel arrangement, the counters continue to act practically independently of each other.

It can be seen that the paths of radiation impinging on the device from any lateral direction must intersect more than one individual counter. Thus even though one counter is in the midst of of its dead time when penetrated by a quantum, the next counter in its path may be in a sensitive state. A bundle of seven small diameter counters as shown has been found to have a resolving power about fifteen times as great as that of a single large counter of equal volume. The number of counters employed may be varied at will, limited only by mechanical difficulties of construction. A bundle of small counters connected in parallel will also have a higher quantum efficiency than a single counter of equal volume due to the increase in the amount of cathode surface provided by the small counters, even if the cathode cylinders are identical in materials and structure.

The invention described herein may be manufactured and used by or for the Government of the United States of America for governmental purposes without the payment of any royalties thereon or therefor.

I claim:

1. A radiation counter device comprising a gas-impervious envelope, a plurality of Geiger-Muller counters each comprising a cathode cylinder and an anode wire axially disposed therein and insulated therefrom, an elongated conductive member having a bore formed therein and extending lengthwise thereof, a plurality of parallel bores formed therein and extending normal to and intersecting said lengthwise bore, each of said parallel bores conductively accommodating one of said cathode cylinders, a pair of conductive members each conductively supporting the corresponding ends of each of said anode wires, means constraining said anode supporting members to lie parallel to said lengthwise bore and spaced from and in insulated relation to said cathode supporting member, said anode supporting members being so positioned and so connected to said anode wires that said anode wires lie in coaxial relation to their respective cathodes, and conductive leads extending from said anode and cathode supporting members to the exterior of said envelope.

2. A radiation counter device as claimed in claim 1, said cathode cylinders being formed of wire mesh.

3. A radiation counter device comprising a gas impervious envelope, a plurality of Geiger-Muller counters within said envelope, each comprising a cylindrical cathode surrounding an anode, means conductively supporting said cathodes in mutual parallelism and in intersecting relation to an axis, said means shielding said cathodes against the incidence of said radiation except that propagated along said axis, and means conductively connecting said anodes in electrical parallelism.

4. A radiation counter device comprising a gas impervious envelope, a plurality of Geiger-Muller counters within said envelope, each comprising a cylindrical cathode surrounding an anode, means conductively supporting said cathodes in mutual parallelism and in intersecting relation to an axis, said means shielding said cathodes against the incidence of said radiation except that propagated along said axis, and means supporting said anodes centrally of their respective cathodes and conductively connecting said anodes in electrical parallelism.

HERBERT FRIEDMAN.